United States Patent
Kim et al.

[11] 3,883,408
[45] May 13, 1975

[54] FURNACE ATMOSPHERE OXYGEN ANALYSIS APPARATUS

[75] Inventors: Yong-Wu Kim, Munster; John P. Douglas, Schereville, both of Ind.

[73] Assignee: Inland Steel Company, Chicago, Ill.

[22] Filed: Jan. 28, 1974

[21] Appl. No.: 437,214

Related U.S. Application Data

[62] Division of Ser. No. 249,876, May 3, 1972, abandoned.

[52] U.S. Cl. .............................. 204/195 S; 204/1 T
[51] Int. Cl. .......................................... G01n 27/46
[58] Field of Search ...................... 204/1 T, 195 S

[56] References Cited
UNITED STATES PATENTS

| | | | |
|---|---|---|---|
| 3,481,855 | 12/1969 | Kolodney et al. | 204/195 S |
| 3,576,730 | 4/1971 | Spacil | 204/195 S |
| 3,619,381 | 11/1971 | Fitterer | 204/1 T |
| 3,758,397 | 9/1973 | Rittiger et al. | 204/195 S |
| 3,767,469 | 10/1973 | Flais et al. | 204/195 S |
| 3,772,177 | 11/1973 | Rittiger et al. | 204/195 S |

FOREIGN PATENTS OR APPLICATIONS

| | | | |
|---|---|---|---|
| 37,800 | 6/1962 | Germany | 204/195 S |

*Primary Examiner*—T. Tung
*Attorney, Agent, or Firm*—Merriam, Marshall, Shapiro & Klose

[57] ABSTRACT

Galvanic cell for measuring oxygen potential in furnace atmospheres uses a tubular solid electrolyte probe containing a mixture of iron and iron oxide as a standard electrode. The interior of the cell is hermetically sealed by a layer of finely divided alumina, while shorting between conductors attached to the exterior and interior of the probe is inhibited by a bed of refractory sand in which one conductor is embedded.

5 Claims, 1 Drawing Figure

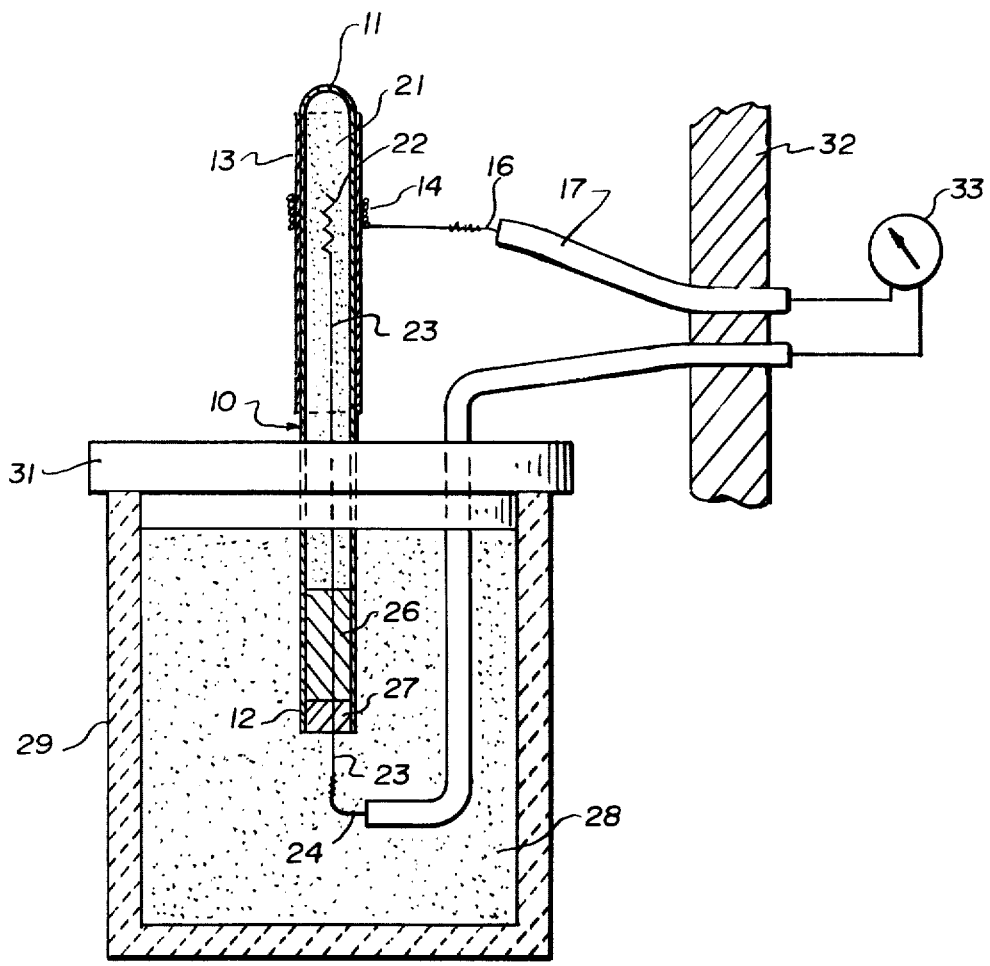

FURNACE ATMOSPHERE OXYGEN ANALYSIS APPARATUS

This is a division of application Ser. No. 249,876, filed May 3, 1972, now abandoned.

This invention relates to oxygen analysis of furnace atmospheres. More particularly it pertains to a method and apparatus for determining whether a given furnace atmosphere is reducing or oxidizing in nature with respect to a ferrous metal in contact therewith at an elevated temperature. Still more particularly, it relates to a method and apparatus for determining oxygen potential in furnace atmospheres using a galvanic cell employing a solid oxide electrolyte.

The use of galvanic cells employing solid electrolytes for measuring oxygen potential is known. In such a cell, a solid oxide electrolyte, which conducts oxygen ions but has negligible electronic conductivity, separates two zones of different oxygen concentrations. At elevated temperatures (above about 700° F.) the electrolyte becomes sufficiently conducting to oxygen ions to cause the appearance of a potential difference across the solid electrolyte, the polarity and magnitude of which depends on the relative difference in oxygen concentration of the atmospheres in contact with each of the electrolyte faces.

By fixing the oxygen concentration at one of the faces of the cell at a known reference level, i.e., by creating a standard electrode, the oxygen concentration of an unknown atmosphere can be measured by exposing the other face to the unknown atmosphere and measuring the generated potential across the cell.

The use of a solid electrolyte galvanic cell for measuring oxygen potential as described, however, presents several operating difficulties. The reference electrode, which is commonly air, must be maintained under uniform temperature and flow conditions. Contamination of the test electrode by the atmosphere of the standard electrode, or vice versa, and electrical short circuits between the electrodes must be avoided. A correction for temperature fluctuations must be made. These problems are intensified by the high temperature conditions under which such cells must operate.

These operating difficulties are eliminated by the device of the invention, which device comprises a solid electrolyte galvanic cell in which the standard electrode is a mixture of iron and iron oxide. The cell is protected against short circuiting by a bed of finely divided refractory material between its electrodes. The device further employs a seal of finely divided aluminum oxide between the reference electrode and the test atmosphere. The use of an iron-iron oxide mixture as the standard electrode provides a direct zero point for the oxidation-reduction of ferrous metals and also provides automatic compensation for fluctuations in furnace atmosphere temperature.

The device of the invention is particularly adapted for use in measuring the oxygen potential of decarburizing atmospheres in metal annealing cycles. At the present time, annealing atmosphere oxygen potential is normally indirectly measured by using a dew point analyzer which monitors the concentration of water vapor in the atmosphere. In addition to the high cost and high degree of maintenance which is required for this type of instrumentation, the dew point as measured serves only as an approximate guide to oxidizing/reducing conditions in the furnace atmosphere. These deficiencies are overcome by the present invention, which provides a rugged and relatively inexpensive, yet highly sensitive device for use in determining the oxygen potential in annealing atmospheres.

The invention will be better understood from the following detailed dscription thereof taken in conjunction with the drawing, which shows in partial section a typical embodiment of the solid electrolyte galvanic cell used to measure oxygen potential in furnace atmospheres in accordance with the invention.

As shown in the drawing, the device of the invention comprises a tubular probe 10 having an integrally closed end 11 and an open end 12. Probe 10 is formed of an oxygen-ion conducting solid electrolyte of a type known to the art, and commercially available. Suitable solid electrolytes are calcia-stabilized zirconia, yttria-stabilized zirconia, calcia-stabilized thoria and yttria-stabilized thoria. Each of them contains the stabilizing material (e.g., calcia) within a relatively narrow range of about 15%, which permits the passage through the electrolyte of oxygen ions while limiting the flow of electrons. Coated around the outer surface of probe 10 near closed end 11, is a thin film 13 of an electrically conducting metal, such as gold, which can resist the elevated temperatures at which the device is used. The thickness of film 13 in the drawing is exaggerated for clarity. In practice a thin film of gold is satisfactory, such as may be obtained by applying to the surface of probe 10 a commercially available gold paste. The use of gold is not a necessary part of the invention; the only requirement is that a good electrical contact be made with the outer surface of probe 10. In order to complete the electrical connection, there is wrapped around the gold film a section of platinum wire 14, which is used because of its stability at high temperatures. The end of platinum wire 14 is connected to a conventional thermocouple wire 16 encased in a suitable protective sheath 17 to prevent possible damage due to the elevated temperature conditions in which the device is used.

Packed within the interior of probe 10 is a mixture 21 of iron and iron oxide in finely divided form, preferably less than 200 mesh. The ratio of iron to iron oxide in this mixture is not critical, suitably ranging from 1:10 to 10:1 parts of iron oxide per part of iron by weight, and being preferably about 1:1. The iron-iron oxide mixture 21 is packed into probe 10 to fill most of the interior volume thereof. Imbedded within the iron-iron oxide mixture 21 is a piece of platinum gauze 22 connected to platinum wire 23, which extends out of the open end 12 of probe 10 and is connected to another length 24 of sheathed thermocouple wire similar to that connected to the outer surface of probe 10. Packed between the iron-iron oxide mixture in probe 10 and the open end of the probe is a layer of finely divided alumina 26, which functions as a seal to prevent contact between the iron-iron oxide mixture within probe 10 and the external atmosphere. The alumina has a particle size below about 200 mesh and the alumina layer 26 is at least about 1 inch thick for effective sealing. The material which is used for this purpose must be non-reactive with iron or iron oxide, electrically non-conducting, and able to withstand high temperatures. In addition to alumina, other materials which can be used in finely divided form for this purpose include silica and zirconia.

Alumina 26 and iron-iron oxide mixture 21 are held within probe 10 by a plug 27 of ceramic cement of a conventional type. The function of plug 27 is mechanical only; a hermetic seal between the exterior of probe 10 and iron-iron oxide mixture 21 is made by the alumina layer 26.

In order to prevent short circuiting between thermocouple leads 14 and 23 which might occur as a result of carbon deposition on the exterior surface of probe 10, the joint between platinum wire 23 and the thermocouple lead 24 is imbedded in a bed of finely divided zirconia sand 28 held in a container 29, suitably made of ceramic and provided with a cover plug 31 of a similar material through which probe 10 and thermocouple wire 24 extend. In addition to zirconia, other materials which can be used for this purpose include silica, alumina, and lime. Such materials must be finely divided (preferably less than 200 mesh), electrically insulating, and able to withstand the high temperatures encountered in the furnace.

During use of the device of the invention the furnace atmosphere gradually deposits carbon on the zirconia sand to which it has access. The layer of carbon contamination slowly increases in thickness until the depth of the thermocouple wire is reached, at which time false potential readings will be encountered unless the zirconia bed is replaced. This is easily done, however, by merely pouring the material out of container 29 and replacing it with a fresh supply of uncontaminated material. The depth of the exposed section of wire 23 below the surface of zirconia bed 28 is not critical; as a practical matter, any depth greater than about 1 inch will give satisfactory protection for reasonable periods of time.

As an alternative to the use of the refractory bed for insulation against short circuiting due to carbon deposition, the cell of the invention can be installed in a chamber physically isolated from the main furnace, to which chamber is supplied a stream of gas taken from the main furnace atmosphere. The chamber can be so designed as to prevent contact of the gas with the conductor leading to the interior of the probe, thus obviating the possibility of a short circuit due to carbon deposition. In using this embodiment, it may be necessary or desirable to provide the chamber with temperature regulating means of a conventional type to keep the temperature within the chamber at the same level as that within the furnace.

As shown in the drawing, thermocouple leads 17 and 24 pass through the wall 32 of the annealing furnace and are connected to potentiometer 33, which measures the polarity and magnitude of the electromotive force (emf) generated by the cell. This emf will be zero if the oxygen potentials of the atmospheres in contact with the interior and exterior surfaces of probe 10 are equal. Since the interior of probe 10 is sealed against the external atmosphere, the oxygen concentration therein will correspond to the equilibrium established between iron and iron oxide, according to the equation $$Fe + \tfrac{1}{2} O_2 \rightleftarrows FeO$$

At equilibrium, the atmosphere within the probe is neither oxidizing nor reducing with respect to iron and iron oxide. Accordingly, when no emf is generated by the cell, the oxygen potential of the external atmosphere corresponds to that within the probe, i.e., it is neither oxidizing nor reducing in nature. As the oxygen potential of the external atmosphere departs from the equilibrium point, however, an emf is generated having a polarity which depends on whether the departure is on the oxidizing side or the reducing side of the point of equilibrium, the magnitude of which depends on the degree of departure from equilibrium. From the observed generated emf, the oxygen potential of the furnace atmosphere can be calculated in a manner known to the art. Alternatively, the instrument can be calibrated by exposing the probe to atmospheres of known oxygen potential.

The device of the invention is particularly useful in controlling the atmospheres used in decarburization annealing of ferrous metals. In such operations, it is desired to maintain the atmosphere at a slightly reducing condition with respect to the metal being treated, but as close to the oxidizing-reducing interface as possible, in order to maximize the rate at which the carbon content of the metal is oxidized. Although the oxygen concentration in the annealing atmosphere under such conditions is extremely low (on the order of $10^{-21}$ atmospheres at 1000°K), the use of iron-iron oxide as the standard electrode permits detection of slight variations in emf caused by changing from a slightly reducing to a slightly oxidizing condition, whereas such a slight change is easily obscured by the large emf generated when air is used as the standard electrode, as is common practice. Moreover, fluctuations in the temperature of the atmosphere, which affect whether a given atmosphere is oxidizing or reducing in nature, are automatically compensated for by the standard iron-iron oxide electrode which changes its equilibrium condition in response to changes in temperature. In addition, since the generated emf is instantly readable there is no delay involved in correcting an upset in the annealing atmosphere condition, such as may be encountered with methods which rely on indirect measurement of oxygen potential, such as the use of a dew point analyzer.

The foregoing detailed description has been given for clearness of understanding only, and no unnecessary limitations should be understood therefrom, as modifications will be obvious to those skilled in the art.

We claim:

1. An oxygen-ion conducting galvanic cell comprising:

an elongated, hollow probe having one open end and having an exterior surface and an interior surface, said probe being made of an oxygen-ion conducting solid electrolyte;

a mixture of finely divided iron and a finely divided oxide thereof, said mixture being compacted in said hollow probe;

a hermetic seal associated with said open end comprising a finely divided, electrically nonconducting inert refractory solid material contained within said probe adjacent said mixture;

mechanical seal means for holding said hermetic seal in position adjacent said mixture;

a first electrical conductor making electrical contact with the exterior surface of said probe;

a second electrical conductor passing through said hermetic seal and making electrical contact with said mixture, said second conductor being electrically insulated from the exterior surface of said probe; and insulating means including a bed of finely divided, electrically non-conductive refractory sand for insulating the point of entry of said second conductor into its associated hermetic seal from the exterior surface of said probe, said point of entry being embedded in said bed of refractory sand.

2. The cell of claim 1 wherein said solid electrolyte is selected from the group consisting of zirconia stabilized with calcia; zirconia stabilized with yttria; thoria stabilized with calcia; and thoria stabilized with yttria.

3. The cell of claim 1 wherein said hermetic seal comprises finely divided alumina.

4. The cell of claim 1 which includes means attached to said first and second conductors for measuring the electromotive force developed between the interior and exterior surfaces of said probe.

5. The cell of claim 1 wherein said refractory sand is zirconia.

* * * * *